United States Patent [19]

Tanuma et al.

[11] 4,066,586

[45] Jan. 3, 1978

[54] POLYESTER-MODIFIED VINYL POLYMER AND PRODUCTION METHOD THEREOF

[75] Inventors: Tuneo Tanuma; Teruo Yoshida, both of Hitachi, Japan

[73] Assignee: Hitachi Chemical Company, Ltd., Japan

[21] Appl. No.: 707,351

[22] Filed: July 21, 1976

[30] Foreign Application Priority Data

July 24, 1975 Japan .................................. 50-90551

[51] Int. Cl.$^2$ .......................... C09D 3/52; C09D 3/66
[52] U.S. Cl. ................... 260/22 CB; 260/21; 260/23 P; 428/458
[58] Field of Search .......................... 260/22 CB, 23 P

[56] References Cited

U.S. PATENT DOCUMENTS

| | | | |
|---|---|---|---|
| 2,600,457 | 6/1952 | Wynstra | 260/23 P |
| 3,052,659 | 9/1962 | Woodruff | 260/22 EP |
| 3,256,225 | 6/1966 | Nevin | 260/23 EP |
| 3,287,293 | 11/1966 | Dalibor | 260/22 CB |
| 3,650,997 | 3/1972 | Weisfeld et al. | 260/21 |
| 3,748,293 | 7/1973 | Torelli | 260/23 P |
| 3,761,435 | 9/1973 | Backderf et al. | 260/22 CB |
| 3,786,010 | 1/1974 | Tsuguwuni et al. | 260/21 |
| 3,920,595 | 11/1975 | Anderson et al. | 260/22 CQ |

*Primary Examiner*—Ronald W. Griffin
*Attorney, Agent, or Firm*—Craig & Antonelli

[57] ABSTRACT

A polyester-modified vinyl polymer comprising 50 - 3% by weight of a polyester component and 50 - 97% by weight of a polyvinyl component grafted on the polyester component, the polyester component having an oil length of 5 to 20%, an average molecular weight of 1,000 to 6,000, and an α,β-unsaturated dicarboxylic acid component content of 1 to 5% by weight on the polyester component. The polyester-modified vinyl polymer is useful in a high-solid solvent type coating composition.

20 Claims, No Drawings

POLYESTER-MODIFIED VINYL POLYMER AND PRODUCTION METHOD THEREOF

This invention relates to a polyester-modified vinyl polymer and method for preparing the same.

Thermosetting acrylic coating resins have heretofore been used to a large extent in surface coating compositions for household electric appliances, colored iron sheets, and automobiles, because they form coating films characterized by excellent resistances to staining, weathering, and chemical attack. Recent trend of the paint industry is toward saving of resources and development of low pollution compositions in order to control exhaust solvent emission as far as possible. To achieve the object it is necessary to increase solids content of the coating composition. Almost all of the conventional thermosetting acrylic coating resins have been produced by solution polymerization using a radical initiator and supplied as a solution of 50 to 60% solids content. In order to prepare a high-solid paint composition with less exhaust solvent emission, it is necessary to obtain a thermosetting acrylic coating composition in the form of a solution having a solids content of 70% or more. A known method for preparing a high-solid solution of thermosetting acrylic resin by solution polymerization consists in increasing the amount of a radical polymerization initiator in the polymerization system. Such a polymerization procedure, however, results in reduced polymerization degree which leads to deterioration in those physical properties of the coating film which are characteristic of the thermosetting acrylic resin.

U.S. Pat. No. 3,287,293 disclosed a process for preparing a thermosetting polyester-modified vinyl polymer, which comprises copolymerizing a polyester, obtained from an aliphatic monocarboxylic acid, polyalcohol, and dicarboxylic acid, with a mixture consisting of an olefinically unsaturated compound having no reactive hydrogen atom and an olefinically unsaturated compound having a reactive hydrogen atom and, in addition, an unsaturated ether radical.

The object of the invention disclosed in U.S. Pat. No. 3,287,293, however, is to provide a polymer which when admixed with an aminoplast will give a resin composition having some thermoplasticity and excellent in solvent resistance and surface hardness. All of the copolymers disclosed in the above patent specification were obtained by use of a peroxide catalyst and had an oil length greater than 20%. The solids content of the coating compositions prepared from the said copolymers was 50% by weight at most. A coating composition having a solids content as high as 70% by weight could not be obtained, because coating compositions of the solids content greater than 50% by weight had too high a viscosity to be adaptable in application procedures.

An object of the present invention is to overcome the aforesaid difficulties by providing a polyestermodified vinyl polymer which has characteristic properties comparable to those of conventional thermosetting acrylic resins and can be used as a resin capable of yielding a coating composition having a solids content greater than 70% by weight.

According to this invention, there is provided a process for producing a polyester-modified vinyl polymer, which is characterized by graft-polymerizing 97 to 50% by weight of a mixture of vinyl monomers in the presence of 3 to 50% by weight of a polyester having an oil length of 5 to 20%, an average molecular weight of 1,000 to 6,000, and containing 1 to 5% by weight of $\alpha,\beta$-unsaturated carboxylic acid component, by use of 5% by weight or more (based on monomeric component) of an azobisnitrile-type catalyst. The polymer thus obtained may be used as a resin component in a high-solid solvent-type coating composition.

The polyester in the present invention has an oil length of 20% or less, that is, 5to 20%, an average molecular weight of 1,000 to 6,000, and 1 to 5% by weight of an $\alpha,\beta$-unsaturated dicarboxylic acid component. The oil length should be 5 to 20%, because if it exceeds 20%, the coating film becomes inferior in resistances to staining and weathering, and if it is less than 5% the polymer solution becomes difficulty compatible with pigments. The presence of $\alpha,\beta$-unsaturated dicarboxylic acid constitutional units in the polyester is necessary as grafting sites. If their content is less than 1% by weight, graft polymerization will not take place to a sufficient degree, whereas if it exceeds 5% by weight, gelation will take place during graft polymerization.

Such polyesters are prepared in a customary way from a polycarboxylic acid component such as phthalic anhydride, isophthalic acid, trimellitic acid, tetrahydrophthalic anhydride, adipic acid, or sebacic acid; a polyalcohol component such as ethylene glycol, diethylene glycol, triethylene glycol, dipropylene glycol, neopentyl glycol, 1,6-hexanediol, glycerol, trimethylolpropane, trimethylolethane, or pentaerythritol; an unsaturated dicarboxylic acid component such as maleic acid, maleic anhydride, fumaric acid, itaconic acid, or citraconic acid; and an oil component such as a natural nondrying oil, as for example coconut oil or castor oil, a synthetic fatty acid, as for example Versatic Acid (Trademark for Shell Chemical Co.), or glycidyl ester of a fatty acid, as for example Cardura E ester (Trademark for Shell Chemical Co.). When glycidyl ester of a fatty acid is used as the oil component, the polymer obtained is excellent particularly in staining resistance.

The vinyl monomers used in this invention are of the acrylic monomer including alkyl acrylates such as ethyl acrylate, propyl acrylate, butyl acrylate, and hexyl acrylate; alkyl methacrylates such as methyl methacrylate, ethyl methacrylate, propyl methacrylate, butyl methacrylate, and hexyl methacrylate; hydroxyalkyl esters such as 2-hydroxyethyl acrylate and 2-hydroxyethyl methacrylate; acrylic acid and methacrylic acid. Other usable vinyl monomers include styrene, styrene derivatives, as for example vinyl toluene and $\alpha$-methylstyrene, acrylonitrile, acrylamide, vinyl chloride, and vinyl acetate. These vinyl monomer may be used alone or in mixtures thereof. When they are used in a mixture it is preferable that the proportion of acrylic monomers in the vinyl monomer mixture employed be at least 70% by weight.

The polymerization catalyst to be used in the present process should be of the azobisnitrile type, because other polymerization catalysts will cause formation of undesirable branched chain during the graft polymerization, resulting in a resin unsuitably for use in high-solid coating compositions. The amount to be used of the catalyst is 5% by weight or more, because if the amount is below 5%, the resulting resin will have too small a solubility in the solvent. Examples of the azobisnitrile type catalysts are azobisisobutyronitrile and 2,2'-azobis(2,4-dimethylvaleronitrile).

In the present process, graft polymerization is carried out preferably at a reaction temperature of 60° to 140° C by adding dropwise vinyl monomers and a polymerization catalyst to the aforesaid polyester resin placed in a reactor. It is also feasible to charge into the reactor at first a portion of the vinyl monomer mixture and a portion of the solvent or, alternatively, to mix a portion of the polyester with the vinyl monomer mixture or the catalyst solution to be added dropwise.

Since a relatively large amount of the catalyst is used in the present process, it is safe to prepare separately the monomer mixture and the catalyst solution and then concurrently add dropwise into the reactor, because if the catalyst is dissolved previously in the monomer mixture to be added dropwise, there is a danger of premature polymerization of vinyl monomers during the course of dropwise addition.

In the present invention, an effective ratio of the polyester resin component to the acrylic resin component (copolymer of vinyl monomer) is from 3 : 97 to 50 : 50, preferably from 10 : 90 to 30 : 70, by weight. If the ratio is below 3 : 97, performance characteristics of the coating film becomes inferior, whereas if it exceeds 50 :50, the staining resistance becomes inferior.

The solvent for use in the polymerization, catalyst solution, and dilution is one or a mixture of two or more selected from the group useful for coatings, consisting of aromatic hydrocarbons such as xylenes, alcohols such as butyl alcohols, esters such as ethyl acetate, ethers, and ketones such as methyl ethyl ketone.

The polyester-modified vinyl polymer obtained according to this invention is so highly soluble in the above solvent that a coating composition containing 70% or more of solids content can be prepared therefrom. As compared with conventional thermosetting acrylic resin coatings, a coating composition prepared from such a high-solid solution admixed with a hardener, epoxy resin, and pigment has substantially the same applicability with same property of coatings and the solvent emission during application is reduced by 30% or more. Since the solids content of the present coating composition may be increased by more than 30% as compared with a conventional coating composition, the present thermosetting coating composition contributes to significant saving in man-hour required for application.

The vinyl polymer is used in an amount of 30 to 95% by weight based on the solids content of the present coating composition.

The hardners used in this invention are those which have been generally used, including epoxy resins such as Epikotes 828 and 1001 (Tradmark for bisphenol type epoxy resins sold by Shell Chemical Co.); aminoplasts such as melamine resin, urea resin and $C_{1-4}$ alkoxylated melamine resin and urea resin; and blocked polyisocyanates. The hardner is used in an amount of 5 to 30% by weight, preferably 15 to 20% by weight in case of the aminoplasts and blocked polyisocyanates, and not more than 15% by weight in case of the epoxy resins, based on total weight of solids and hardner.

Needless to say, either of color or body pigments can be incorporated in at most same amounts as the polymer.

The invention is illustrated below in detail with reference to examples, but the invention is not limited thereto. In Examples all parts are by weight.

EXAMPLE 1

Into a 1-liter four-neck flask provided with a stirrer, thermometer, inlet tube for nitrogen, reflux condenser, and trap, were charged 251.5 parts of isophthalic acid, 15.0 parts of maleic anhydride, 118.5 parts of 1,6-hexanediol, 71.0 parts of trimethylolpropane, and 44.0 parts of Cardura E (Shell Chemical Co.). The mixture was allowed to react for 2 hours at 180° C, then 2 hours at 190° C, and finally 10 hours at 210° to 220° C. The reaction mixture was diluted with xylene to a solids content of 60% to obtain a polyester resin preparation (A) having a viscosity (Gardner, 25° C) of $Z - Z_1$, an acid number of 16, and a color number (Gardner color scale) of 1.

Then, into a 1-liter four-neck flask equipped with a stirrer, thermometer, inlet tube for nitrogen, reflux condenser, and dropping funnels, were charged 175.0 parts of the polyester resin preparation (A) and 21.0 parts of butanol. Into the flask, while being kept at 80 ± 2° C, were added dropwise over a period of 3 hours a vinyl monomer mixture comprising 198.8 parts of sytrene, 327.6 parts of ethyl acrylate, 9.1 parts of methacrylic acid, and 59.5 parts of 2-hydroxyethyl methacrylate and, concurrently with said monomer mixture, a catalyst solution of 41.6 parts of 2,2'-azobis(2,4-dimethylvaleronitrile) in 84.0 parts of xylene. Thereafter, the flask was kept at the said temperature for 1 hour, then at 120° C for further 1 hour to obtain a polyester-modified vinyl polymer preparation (B) with a conversion of 99.9% or more. The ratio of polyester resin component to vinyl monomer component was 15 : 85 by weight. The preparation (B) showed a solids content of 70.0%, a viscosity (Gardner, 250° C) of Y-Z, an acid number of 7.6, and a color number (Gardner color scale) of less than 1.

The polyester-modified vinyl polymer preparation (B), Melan 28 (Trademark for a butylated melamine resin produced by Hitachi Chemical Company, Ltd.) and Epikote 1001 (Trademark for an epoxy resin produced by Shell Chemical Co.) were mixed in a ratio of 70 : 25 : 5 in terms of solids. To the mixture was added titanium white to obtain a white coating composition containing 50% by weight of the pigment.

Table 1.

| Performance characteristics | | | |
|---|---|---|---|
| | Ex. 1 | Referential Ex. 1 | Referential Ex. 2 |
| Solids content of coating composition (For cup #4; 25° C; 25 seconds) (%) | 70 | 70 | 50 |
| Physical property  Ericksen test (mm) | 5.0 | 4.0 | 5.5 |
| Impact test (½", 500 g) (cm) | 45 | 25 | 45 |
| Secondary physical property (Ericksen test after immersion in boiling water) (mm) | 3.0 | 0.7 | 2.0 |
| Staining resistance (red "Magic Ink (dry ink)"; 30° C; 24 hours) | Trace (faint) | Trace | Good |
| Chemical resistance (5% HCl) | Fair | Poor | Fair |

Note:
(1) Baking: 150° C × 20 minutes; thickness of coating film: 30 – 25 μ; test panel: sheet steel treated with Bonderite #144 (150 × 70 × 0.8 mm; Japan Test Panel Co.)
(2) Secondary physical property was evaluated by the Ericksen test on a coated test panel which had been immersed in boiling water for 2 hours and left standing at room temperature for 2 hours.
(3) Staining resistance was evaluated by inspecting a coated test panel which had been applied with red "Magic Ink", kept standing at 30° C, for 24 hours, and then cleaned with butanol.

REFERENTIAL EXAMPLE 1

An acrylic resin preparation was obtained under similar conditions to those in Example 1 by use of the same vinyl monomer component alone. A white coating composition was prepared in the same manner as in Example 1, except that the above acrylic resin preparation was used in place of the polyester-modified vinyl polymer preparation (B).

REFERENTIAL EXAMPLE 2

A white coating composition was prepared by using a conventional thermosetting acrylic resin Hitaloid 2439A (Trademark for Hitachi Chemical Company, Ltd.) in place of the polyester-modified vinyl polymer preparation (B) in Example 1.

Performance characteristics of the white coating compositions obtained in Example 1 and Referential Examples 1 and 2 were as shown in Table 1.

EXAMPLE 2

Into the same apparatus for the synthesis of polyester resin as used in Example 1, were charged 131.0 parts of isophthalic acid, 117.5 parts of phthalic anhydride, 15.0 parts of maleic anhydride, 50.5 parts of glycerol, 141.0 parts of dipropylene glycol, and 45.0 parts of Cardura E. The mixture was heated at 180° C for 2 hours, then at 190° C for 2 hours, and finally at 210° to 220° C for 9 hours. The reaction mixture was diluted with 237.6 parts of xylene and 59.4 parts of butanol to obtain a polyester resin preparation (C) having a solids content of 60.0%, a viscosity (Gardner; 25° C) of S-T, an acid number of 15.0, and a color number of 2. Vinyl polymerization was conducted, following the procedure of Example 1, to obtain a polyester-modified vinyl polymer preparation (D) having a solids content of 70%, a viscosity (Gardner, 25° C) of X-Y, an acid number of 7.5, and a color number (Gardenr color scale) of 1. A coating composition was prepared from this vinyl polymer (D) according to the formulation used in Example 1. This composition gave a coating film having performance characteristics practically comparable to those of the coating film from the polyester-modified vinyl polymer (B).

EXAMPLE 3

The same polyester resin and vinyl monomer mixture as used in Example 1 were reacted in a ratio of 25 : 75 (by weight) to yield a polyester-modified acrylic resin preparation (E) having a solids content of 70%, a viscosity (Gardner, 25° C) of Y-Z, an acid number of 8.0 and a color number (Gardner color scale) of less than 1. This resin preparation (E), an aminoplast Melan 245 [Trademark for a high-solid butylated melamine resin of Hitachi Chemical Company, Ltd.; 70% solids; viscosity (Gardner, 25° C) W-X], and an epoxy resin Epikote 1001 were mixed in a ratio of 70 : 25 : 5 (in terms of solids) and admixed with titanium white to a pigment content of 50% by weight. The resulting composition was diluted with a thinner comprising xylene and butanol in a ratio of 80 : 20 to a solids content of 80%. The coating composition thus obtained was applied by means of a bar coater #34 to a galvanized sheet steel, 0.25 mm in thickness, to a film thickness of 20 –15 μ. On baking at 230° C for 60 seconds, the coating gave a dried film having both adherence and resistance to hydrochloric acid comparable to those of the conventional thermosetting acrylic resin for colored sheet iron.

EXAMPLE 4

A resin solution containing 70% solids was obtained by vinyl polymerization, as in Example 1, from 175.0 parts of the polyester resin (A) obtained in Example 1; a monomer mixture comprising 238.0 parts of styrene, 50.4 parts of methyl methacrylate, 119.0 parts of butyl methacrylate, 119.0 parts of butyl acrylate, 9.1 parts of methacrylic acid, and 59.5 parts of 2-hydroxyethyl methacrylate; and a catalyst solution of 41.6 parts of 2,2'-azobis(2,4-dimethylvaleronitrile) in 84.0 parts of ethyl acetate. Upon removal of the ethyl acetate from the above resin solution by distillation, there was obtained a polyester-modified acrylic resin preparation (F) having a solids content of 80%, a viscosity (Gardner, 25° C) of Y-Z, an acid number of 7.6, and a color number (Gardner) of less than 1. This resin preparation (F) and an aminoplast Melan 245 (the same as in Example 3) were mixed in a ratio of 70 : 30 (in terms of solids) and then admixed with 2.2% by weight of an aluminum paste to obtain a metallic coating composition.

REFERENTIAL EXAMPLE 3

Each of the procedures of Examples 1 to 3 was repeated, except that di-tert-butyl peroxide was used in place of the azobisnitrile-type catalyst. The resin obtained in each case was gel-like or in the form of gel and, hence, was unsuitable for use as a coating resin.

REFERENTIAL EXAMPLE 4

[polyester resin: vinyl monomers = 62.4 : 37.6 (weight ratio)]

Into a 1-liter four-neck flask provided with a stirrer, thermometer, inlet tube for nitrogen, reflux condenser, and trap, were charged 355 parts of castor oil, 117.5 parts of pentaerythritol, 90 parts of ethylene glycol, 257.5 parts of phthalic acid, 12.5 parts of maleic acid, and 25 parts of p-tert-butylbenzoic acid. The mixture was allowed to react at 180° C until the acid number became 55. After addition of 40 parts of xylene, the mixture was further allowed to react at 180° to 200° C until the acid number became 28 to 30 to obtain a polyester resin solution. The resulting polyester resin solution was diluted with xylene to a solids content of 60% and a viscosity (Gardner, 25° C) of $Z_2 - Z_3$ to obtain a polyester resin preparation (G).

Then, into a 1-liter four-neck flask equipped with a stirrer, thermometer, inlet tube for nitrogen, reflux condenser, and dropping funnels, were charged 490 parts of the polyester resin preparation (G) and 315 parts of xylene. Into the flask, while being kept at 130° ± 2° C, were added dropwise over a period of 2 hours a monomer mixture comprising 220 parts of styrene, 50 parts of butyl methacrylate, and 25 parts of methacrylic acid and a catalyst solution of 35 parts of 2,2'-azobis(2,4-dimethylvaleronitrile) in 84 parts of xylene, through the dropping funnels, respectively. Thereafter, the flask was kept at the said temperature for 1 hour to obtain a polyester-modified vinyl polymer preparation (H) with a conversion of 99.9% or more. The vinyl polymer preparation (H) had a solids content of 50%, a viscosity (Gardner; 25° C) of $Z_5 - Z_6$ (semi-gel), an acid number of 40, and a color number (Gardner) of 2.

The above polyester-modified vinyl polymer preparation (H), a butylated melamine resin Melan 28 (Trademark for Hitachi Chemical Company, Ltd.), and an epoxy resin Epikote 1001 (Trademark for Shell Chemical Co.) were mixed in a ratio of 70 : 25 : 5 in terms of solids. To the mixture was added titanium white to obtain a white coating composition containing 50% by weight of the pigment.

REFERENTIAL EXAMPLE 5

[A polyester resin having an oil length of 40%]

Into a 1-liter four-neck flask provided with a stirrer, thermometer, inlet tube for nitrogen, reflux condenser, and trap, were charged 434.8 parts of isophthalic acid, 26.1 parts of maleic anhydride, 119.5 parts of 1,6-hexanediol, 71.5 parts of trimethylolpropane, and 400 parts of Cardura E (produced by Shell Chemical Co.). The mixture was allowed to react at 180° C for 2 hours, then at 190° C for 2 hours, and finally at 210° to 220° C for 5 hours. The reaction mixture was diluted with xylene to a solids content of 60% to obtain a polyester resin preparation (I) having a viscosity (Gardner, 25° C) of W-Y, an acid number of 16, and a color number (Gardner) of less than 1.

Then, into another 1-liter four-neck flask equipped with a stirrer, thermometer, inlet tube for nitrogen, reflux condenser, and dropping funnels, were charged 175 parts of the above polyester resin preparation (I) and 21 parts of butanol. Into the flask, while being kept at 80° ± 2° C, were added dropwise over a period of 3 hours, through the dropping funnels, concurrently a vinyl monomer mixture comprising 198.8 parts of styrene, 327.6 parts of ethyl acrylate, 9.1 parts of methacrylic acid, and 59.5 parts of 2-hydroxyethyl methacrylate and a catalyst solution of 41.6 parts of 2,2'-azobis(2,4-dimethylvaleronitrile) in 84 parts of xylene. Thereafter, the flask was kept at the said temperature for 1 hour, then at 120° C for further 1 hour to obtain a polyester-modified vinyl polymer preparation (J) with a conversion of 99.9% or more. The ratio of polyester resin component to vinyl monomer component was 15 : 85 by weight. The vinyl polymer preparation (J) had a solids content of 70%, a viscosity (Gardner, 25° C) of X-Y, an acid number of 7.6, and a color number (Gardner) of less than 1.

The polyester-modified vinyl polymer preparation (J), a butylated melamine resin Melan 28 (Trademark for Hitachi Chemical Company, Ltd.), and an epoxy resin Epikote 1001 (produced by Shell Chemical Co.) were mixed in a ratio of 70 : 25 : 5 in terms of solids. To the mixture was added titanium white to obtain a coating composition containing 50% by weight of the pigment.

Performance characteristics of the white coating compositions obtained in Referential Examples 4 and 5 were as shown in Table 2.

Table 2

| | Referential Example 4 | Referential Example 5 |
|---|---|---|
| Solids content of coating composition (Ford cup #4, 25° C, 25 seconds) (% by weight) | 40 | 70 |
| Physical properties  Ericksen test (mm) | 5.5 | 5.0 |
| Impact test (cm) | 45 | 45 |
| Secondary physical property (Ericksen test after immersion in boiling water) (mm) | 3.0 | 3.0 |
| Staining resistance (red "Magic Ink (dry ink)"; 30° C; 24 hours) | Trace | Trace (significant) |
| Chemical resistance (5% HCl) | Fair | Poor |

Note:
Testing methods were as described in the note to Table 1.

The present polyester-modified vinyl polymer obtained according to this invention retains characteristic properties of the conventional thermosetting acrylic resin, because the reduced polymerization degree, which is necessary for a resin for use in high-solid solvent-type coating compositions, is counter-balanced by the polyester-modification.

The present polyester-modified acrylic resin makes it possible to prepare, within the frame-work of conventional formulations, high-solid coating compositions which, as compared with conventional thermosetting acrylic resin coating compositions, may reduce the exhaust solvent emission by 30% or more, thus contributing to the saving of resources and the reduction of pollution.

What is claimed is:

1. A process for producing a polyester-modified vinyl polymer for use in a high-solids coating composition, which comprises graft-polymerizing 97 to 50% by weight of at least one vinyl monomer selected from the group consisting of an acrylic monomer, styrene, a styrene derivative, acrylonitrile, acrylamide, vinyl chloride and vinyl acetate, in the presence of 3 to 50% by weight of a polyester having an oil length of 5 to 20%, an average molecular weight of 1,000 to 6,000, and an $\alpha,\beta$-unsaturated dicarboxylic acid component content of 1 to 5% by weight on the polyester, by use of 5% by weight or more (based on monomeric component) of an azobisnitrile catalyst.

2. A process according to claim 1, wherein 10 to 30% by weight of the polyester and 90 to 70% by weight of the vinyl monomer are used.

3. A process according to claim 1, wherein the vinyl monomer is an acrylic monomer.

4. A process according to claim 3, wherein the acrylic monomer is selected from the group consisting of an alkyl acrylate, alkyl methacrylate, hydroxyalkyl acrylate, hydroxyalkyl methacrylate, acrylic acid and methacrylic acid.

5. A process according to claim 4, wherein the acrylic monomer is selected from the group consisting of ethyl acrylate, propyl acrylate, butyl acrylate and hexyl acrylate.

6. A process according to claim 4, wherein the acrylic monomer is selected from the group consisting of ethyl methacrylate, propyl methacrylate, butyl methacrylate and hexyl methacrylate.

7. A process according to claim 4, wherein the acrylic monomer is selected from the group consisting of 2-hydroxyethyl acrylate and 2-hydroxyethyl methacrylate.

8. A process according to claim 1, wherein a mixture of vinyl monomers contains at least 70 to 100% by weight of at least one acrylic monomer.

9. A process according to claim 1, wherein the oil length of the polyester used has been adjusted to 5 to 20% by use of a glycidyl ester of a fatty acid.

10. A process according to claim 1, wherein the azobisnitrile catalyst is azobisisobutyronitrile or 2,2'-azobis(2,4-dimethylvaleronitrile).

11. A process according to claim 1, wherein the styrene derivative is selected from the group consisting of vinyl toluene and $\alpha$-methyl styrene.

12. A process according to claim 1, wherein the graft-polymerization is conducted at a temperature in the range of 60° to 140° C. by adding dropwise the vinyl monomer and the azobisnitrile catalyst to the polyester resin.

13. A process according to claim 12, wherein the vinyl monomer and the azobisnitrile catalyst are added separately and concurrently to the polyester resin.

14. A polyester-modified vinyl polymer produced by the process according to claim 1.

15. A high solids coating composition having a solids content of 70% by weight or more, comprising 30 – 95% by weight, based on the solids content, of the polyester-modified vinyl polymer according to claim 7, a hardener in an amount sufficient to harden the vinyl polymer, and a solvent.

16. The composition of claim 15, wherein the hardener is an aminoplast, blocked polyisocyanate or epoxy resin.

17. The composition of claim 16, wherein the aminoplast is a melamine resin, $C_{1-4}$ alkoxylated melamine resin, urea resin or $C_{1-4}$ alkoxylated urea resin.

18. The composition of claim 15, wherein the hardener is present in an amount of 5 to 30% by weight based on the solids and hardener content.

19. The composition of claim 18, wherein the hardener is an aminoplast or blocked polyisocyanate present in an amount of 15 to 20%.

20. The composition of claim 18, wherein the hardener is an epoxy resin present in an amount of not more than 15%.

* * * * *